Oct. 8, 1957 O. K. DOYLE 2,808,850
BALL COCK VALVE
Filed Sept. 30, 1955 2 Sheets-Sheet 1
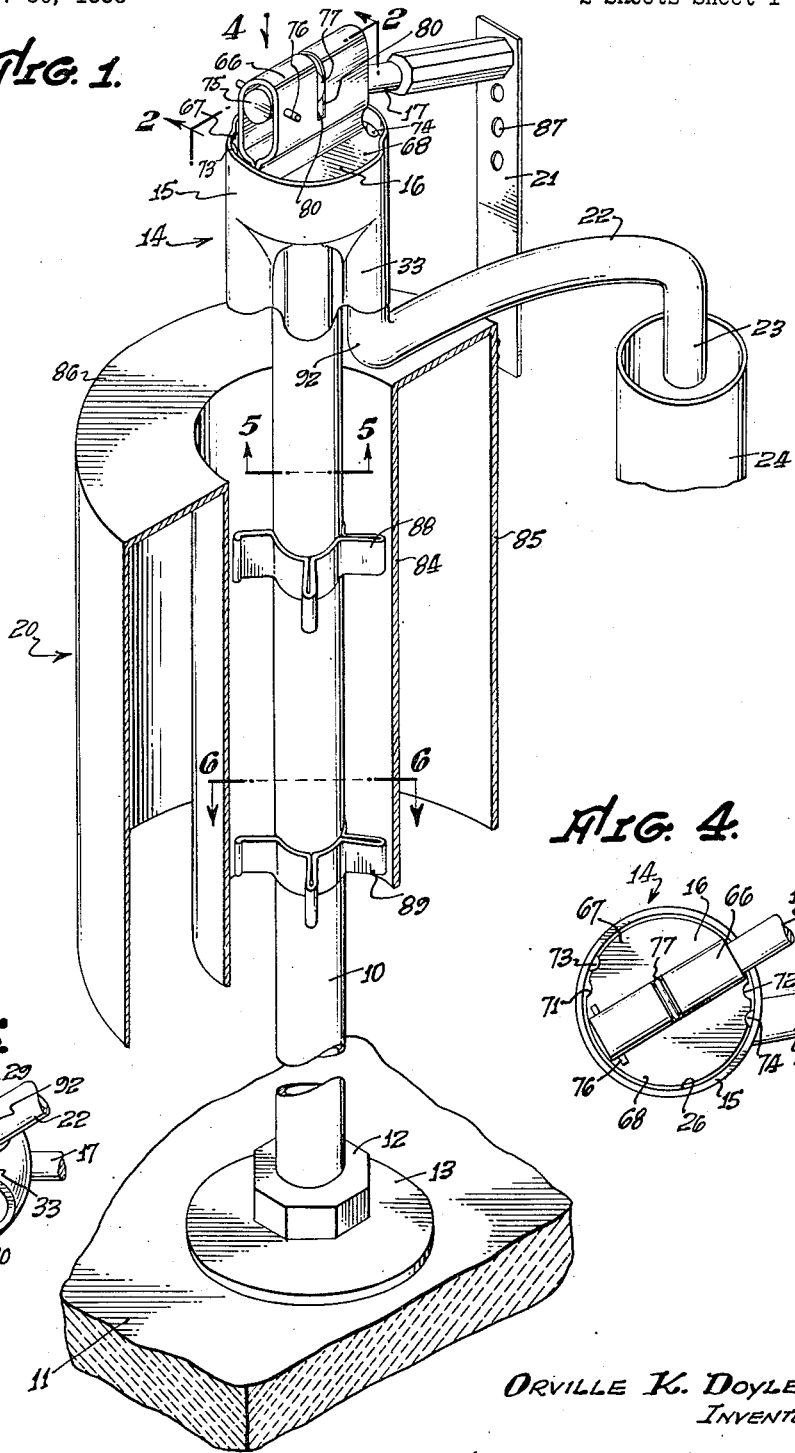
ORVILLE K. DOYLE,
INVENTOR.
By His Attorneys.
HARRIS, KIECH, FOSTER & HARRIS Oct. 8, 1957 O. K. DOYLE 2,808,850
BALL COCK VALVE
Filed Sept. 30, 1955 2 Sheets-Sheet 2
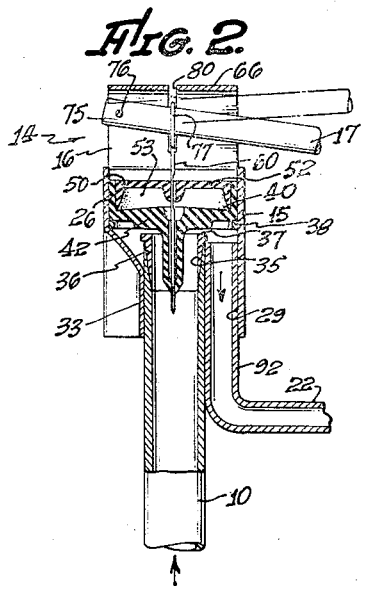
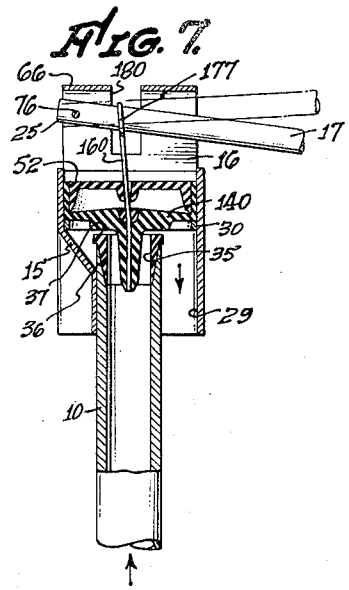
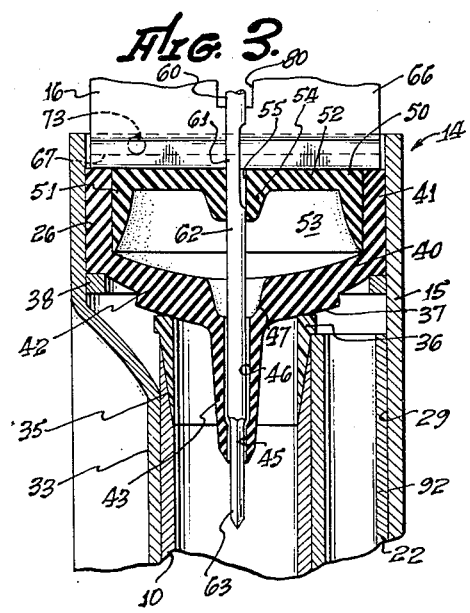
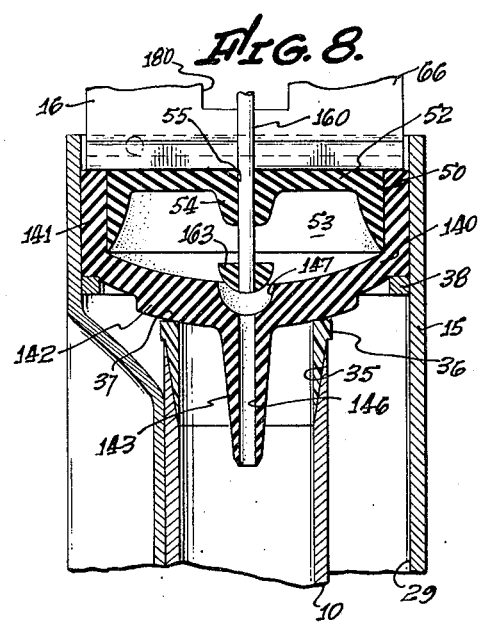
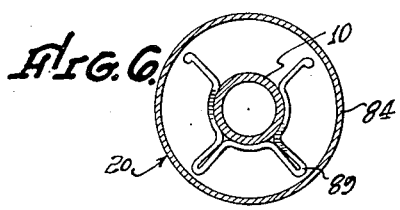
ORVILLE K. DOYLE,
INVENTOR.
By His Attorneys.
HARRIS, KIECH, FOSTER & HARRIS.

United States Patent Office 2,808,850
Patented Oct. 8, 1957

2,808,850

BALL COCK VALVE

Orville K. Doyle, Fullerton, Calif.

Application September 30, 1955, Serial No. 537,640

16 Claims. (Cl. 137—414)

This invention relates to ball cock valves for control of fluid flow, and, in particular, to a ball cock valve suitable for use in a flush tank or the like. Although the preferred embodiment of my invention is shown and described as a ball cock valve suitable for use in a toilet flush tank, I do not intend to be limited to such application of the invention as it has other appropriate uses.

It is an object of the invention to provide a ball cock valve which may be automatically actuated in response to some predetermined standard, such as the liquid level in a tank. It is another object of the invention to provide a ball cock valve in which the pressure of the inflowing fluid is utilized to move the shutoff means and control the flow of said incoming fluid. A further object of the invention is to provide such a ball cock valve which will operate satisfactorily with incoming fluid pressures less than one pound per square inch above the exhaust pressure.

Another object of the invention is to provide a valve in which a portion of the incoming fluid is channeled into a pressure chamber formed of a flexible, temporarily deformable material, the fluid under pressure exerting forces against the inner walls of the pressure chamber to make the chamber fluid tight, to hold the chamber in position, and to flex a wall of the chamber into engagement with a valve seat shutting off the flow of fluid through the valve. Another object of the invention is to provide such a valve in which fluid enters the pressure chamber through a first passage and exits through a second passage, the two passages being sealed and opened by a single rod engaging both passages.

It is a further object of the invention to provide a valve through which the fluid flows at a maximum rate for substantially the entire flow cycle, and yet in which the flow is shut off without producing hammer in the supply line. A further object of the invention is to provide such a valve in which the relative times of closing the exhaust passage and opening the inlet passage of the pressure chamber can be precisely controlled to give positive shutoff action.

Still another object of the invention is to provide a valve of the type described which is small in size, light in weight, inexpensive and easily fabricated from readily available materials, and one in which only three moving parts are required, thereby providing a long service life with minimum maintenance requirements.

It is another object of the invention to provide a valve which is quiet in operation, such quiet operation being achieved by providing flexible cushioning in the form of a flexible diaphragm positioned at the point of change in direction of flow of fluid, by providing a flow path for the fluid having no restrictions therein, thereby generating a minimum of turbulence in the fluid, and by providing a plurality of outlet pipes each of which is straight and of a length at least one and one-half times greater than its maximum cross-sectional dimension, thereby producing laminar flow in the exiting fluid.

Another object of the invention is to provide a float-actuated valve which requires very small forces for operation thereof, and one in which the float is concentrically positioned around the valve and standpipe, thereby requiring a minimum space for installation and operation. A further object of the invention is to provide such a valve in which the concentrically positioned float has sides and a top but which is open at the bottom thereof, air for lifting the float being trapped therein when the tank is empty.

It is a further object of the invention to provide a valve adapted to be actuated by a conventional hollow, spherical float mounted on an outwardly extending lever arm in which the lever arm support is rotatable in a horizontal plane relative to the remainder of the valve so that the position of the lever arm and float attached thereto may be adjusted relative to the walls of a tank after the valve has been permanently installed in the tank.

A further object of the invention is to provide such a valve having a positive shutoff by employing fluid pressure as the shutoff medium whereby a positive seal is assured and whereby the greater the fluid pressure the tighter the seal.

Another object of the invention is to minimize noise during operation of the valve, which I accomplish in part by providing a full supply line opening to fill the tank until the valve operates to shut off such supply line. By providing such full line opening during filling of the tank, the fill up rate is uniform and many times faster than any conventional ball cocks known to me, and this is another object of the invention.

Still another object of the invention is to provide such a valve in which only a small mechanical force is required to close the valve, which avoids the necessity for the long lever arm and a large ball float required with conventional ball cocks.

The invention also comprises novel details of construction and novel combinations and arrangements of parts which will more fully appear in the course of the following description. The drawings merely show and the description merely describes preferred embodiments of the present invention which are given by way of illustration or example.

In the drawings, wherein like parts in different figures are designated by the same numerals:

Fig. 1 is an isometric view, shown partly in section, of a preferred embodiment of the invention mounted in the bottom of a flush tank or the like;

Fig. 2 is a sectional view of a portion of the embodiment of Fig. 1 taken along the line 2—2 thereof, showing the valve in the flow position;

Fig. 3 is an enlarged view of a portion of Fig. 2, showing the valve in the shut position;

Fig. 4 is a plan view taken as indicated by the arrow 4 of Fig. 1;

Fig. 5 is a partial sectional view taken along the line 5—5 of Fig. 1;

Fig. 6 is a partial sectional view taken along the line 6—6 of Fig. 1;

Fig. 7 is a sectional view similar to that of Fig. 2 of an alternative embodiment of the invention; and Fig. 8 is an enlarged view of a portion of the embodiment shown in Fig. 7.

In the embodiment of the invention shown in Fig. 1, a standpipe 10 is mounted in the bottom of a tank 11, the lower end of the standpipe being fixed in an upper portion 12 of a flanged bushing 13 which extends downward through the bottom of the tank 11 for attachment thereto. A valve mechanism 14 is contained in a casing 15 attached to the upper end of the standpipe 10, the upper end of the casing being closed by a cap 16 which also pivotally mounts a lever 17. A float 20, which moves up and down about the standpipe 10 as a function of the water level in the tank 11, is attached to the lever 17 by a bracket 21. A refill pipe 22 is engaged with and extends downward from the casing 15, an outlet end 23 of the refill pipe being displaced horizontally from the other end 92 and being positioned in the mouth of an overflow pipe 24.

That portion of the valve of the invention positioned within the casing 15 is shown in detail in Figs. 2 and 3, the valve being in the "flow" position in Fig. 2 and in the "shut" position in Fig. 3. The cylindrical casing 15 comprises an upper portion having a single cylindrical opening 26 therein, and a lower portion having four smaller cylindrical openings or passages 27, 28, 29, 30 positioned around the upper end of the standpipe 10 (see Fig. 5). The casing 15 is preferably made of a single piece of tubing having four depressions 33 formed in the lower portion thereof to engage the standpipe 10, this engagement of the depressed portions of the casing with the standpipe forming the passages 27, 28, 29, 30 and also supporting the casing at the top of the standpipe. The casing may be staked or soldered to the standpipe, if desired.

The interior of the upper end of the standpipe 10 has an outward taper 35, an insert 36 having a corresponding taper being telescopically positioned in the standpipe. While such an insert is not necessary in the valve of the invention, when made of a rugged and durable material such as Teflon, nylon, or the like, the insert will provide a marked increase in the life of the valve. The valve seat, which is the upper face 37 of the insert 36, is subjected to severe erosion forces by the flow of fluid up through the standpipe 10, across the upper face 37 and down through the passages 27, 28, 29 and 30, as shown by the arrows in Fig. 2.

A support ring 38, which may be integral with casing 15, is positioned on the interior wall of the casing 15 near the bottom of the cylindrical opening 26, a lower seal unit 40 being positioned within the opening 26 and resting on the support ring 38. The lower seal unit 40 includes a cylindrical wall 41, a diaphragm 42 adjoining the lower edges of the wall 41, and a boss 43 extending downward from the central portion of the diaphragm. The lower seal unit is made of a flexible, temporarily deformable material such as rubber so that the diaphragm 42 may be displaced from its normal position, as seen in Fig. 2, to a position engaging the face 37 of the insert 36 blocking flow of fluid from the standpipe 10 to the passages 27, 28, 29 and 30, as seen in Fig. 3. An opening having three portions 45, 46, 47 of different cross-sectional dimensions extends vertically through the boss 43 of the lower seal unit 40.

An upper seal unit 50 comprising a cylindrical wall 51 and a flat portion or plate 52 adjoining the upper end of the wall 51 is telescopically positioned within the lower seal unit 40, forming a pressure chamber 53 therebetween. A boss 54 having an opening 55 therein coaxial with the opening in the boss 43 extends into the pressure chamber 53 from the plate 52. The upper seal unit 50 may be made of the same flexible, temporarily deformable material as the lower seal unit.

A rod 60 extends through the aligned openings in the upper and lower seal units, the rod having a central portion 61, an intermediate portion 62 and an end portion 63. The cross-sectional areas of the central portion 61 and the end portion 63 are each less than the cross-sectional area of the intermediate portion 62, the latter portion being shaped and dimensioned so that it is a tight, sliding fit in the openings 45 and 55, these openings preferably being circular in cross section for reasons to be discussed subsequently.

The cap 16, which consists of an oval-shaped, upstanding shell 66 and a pair of horizontally disposed, opposing flanges 67, 68, is set in the upper opening 26 of the casing 15, resting on the upper and lower seal units 50 and 40. Opposing notches 71, 72 in the flanges 67, 68, respectively, permit the cap 16 to be moved downward in the opening 26 of the casing 15 past opposing projections 73, 74 extending into the opening 26 from the casing 15, the projections being formed in the casing by suitable means, such as by dimpling. The cap 16 may be retained in place in the casing by rotating the cap in a horizontal plane with the flanges 67, 68 positioned below the projections 73, 74, as seen in Fig. 4. The cap 16 may be rotated to and retained in any angular position relative to the remainder of the valve except for the particular position where the notches 71, 72 and the projections 73, 74 are aligned. The lever 17 is positioned within the shell 66 of the cap 16 with an end 75 pivotally mounted on the shell by suitable means such as a pin 76, as seen in Figs. 1 and 2.

The rod 60 passes between the opposing flanges 67, 68 of the cap 16, the upper end of the rod being formed into a loop or eyelet 77 which surrounds and slides freely on the lever 17, and which is guided to move in a vertical path by a slot 80 in the shell 66 of the cap. The slot 80 is dimensioned so that the loop 77 of the rod 60 will move freely therein but only in a straight line as the lever 17 pivots about the pin 76, thereby providing for a minimum of side play and looseness in the movement of the rod 60 through the upper and lower seal units 50, 40. It is seen that, when this eyelet coupling between the lever 17 and the rod 60 is utilized, the rod will rotate when the cap 16 is rotated, thereby necessitating that the openings 45 and 55 be circular in cross section and concentric with the opening 26, and that the intermediate portion 62 of the rod 60 be circular in cross section.

It is understood that the conventional hollow spherical float may be used with the valve of the invention simply by threading the inner end of the arm of such a conventional float in the opening in the end of the lever 17 to which bracket 21 is attached in Fig. 1, or in any other suitable manner. Even if such a conventional type float is used, it need only be very small in diameter and its connecting arm may be very short because the mechanical force required to close the valve 14 is much less than in conventional ball cocks. The float 20 of Fig. 1 is preferred because of its smaller space requirements and reliability. An inner cylindrical wall 84 and an outer cylindrical wall 85 are joined at their upper ends by a ring 86 to provide a downwardly opening air enclosure. The bracket 21 is attached to the outer wall 85 by suitable means, such as spot welding, a plurality of openings 87 being provided in the upper end of the bracket 21 for selectively attaching the bracket to the end of the lever 17 by a screw or the like to obtain different shutoff liquid levels. The inside dimensions of the wall 84 are preferably large enough to enable the float to be passed downward around the casing 15 when the lever 17 and the refill pipe 22 are not in place so that the float can be installed after the standpipe has been fixed in position. Two spring clips 88, 89 are snapped around the standpipe 10 to serve as guides for the up-and-down motion of the float 20. The cylindrical form for the float is preferred because of the ease of fabrication, but it should be noted that the particular shape of the float is not critical, the downward opening air enclosure and the positioning of the float around the standpipe, either with a sealed or open air enclosure, being the essential features of the float.

The refill pipe 22 has an upwardly extending inlet 92 (Figs. 1 and 5) which is a push fit into the outlet passage 29 and has a downwardly extending outlet 23 which is horizontally displaced from the inlet 92. The force due to gravity provides a clockwise torque, as viewed in Fig. 1, on the refill pipe when no water is flowing therethrough, which retains the pipe in engagement with the casing 15. When water is flowing out of the end 23, the reaction force provides a counterclockwise torque which acts to retain the pipe in engagement with the casing during this portion of the operation cycle.

In Fig. 2, the valve is shown in the open or flow condition with fluid flowing up the standpipe 10, between the valve seat or face 37 of the insert 36 and the diaphragm 42 of the lower seal unit 40, and down through the outlet passages 27, 28, 29 and 30. The central portion 61 of the rod 60 is positioned in the opening 55 in the upper seal unit 50, and the intermediate portion 62 of the rod is positioned in the smallest opening 45 in the boss 43 of the lower seal unit 40. Thus, the pressure chamber 53 is maintained at atmospheric pressure, the opening 55 providing communication with the surrounding atmosphere, either liquid or gas.

As the lever 17 is pivoted upward, the rod 60 is moved vertically through the seal units to the position shown in Fig. 3 where the intermediate portion 62 closes the upper opening 55, but not the lower opening 45. A portion of the fluid flowing upward in the standpipe 10 passes through the opening 45 around the end portion 63, through the opening 46 around the intermediate portion 62 and into the pressure chamber 53. The downward force on the diaphragm 42 produced by the fluid in the pressure chamber 53 is sufficient to overcome the upward force of the fluid flowing upward through the pipe 10 and over the face 37 so that the diaphragm 42 is moved downward into contact with the face 37, thereby stopping further flow of fluid through the valve. The fluid in the pressure chamber 53 also exerts outward radial forces on the wall 51 of the upper seal unit 50, thereby producing a tight seal between the upper and lower seal units and between the lower seal unit and the casing. The fluid in the pressure chamber also exerts inward radial forces on the boss 54, providing a tight seal around the intermediate portion 62 of the rod 60 in the opening 55. Because of these sealing forces provided by the pressure of the incoming fluid, it is not necessary to rigidly clamp the upper and lower seal units in place, thereby eliminating stress and strain at the clamping surfaces and substantially increasing the life of the seal units.

A substantial force differential on the diaphragm 42, which enables the valve to be used when the incoming fluid pressure is less than a pound per square inch greater than the surrounding atmosphere, can be achieved by extending the lower end of the boss 43 downward into the standpipe 10 a substantial distance, as shown in Fig. 3. Since the inlet to the chamber 53 is at the lower end of the boss 43, the pressure of the fluid in the chamber will be greater than the pressure of the fluid at the lower surface of the diaphragm. This difference in pressures augments the differential in forces achieved by the difference in the surface areas acted upon by the fluid in the chamber 53 and the fluid in the standpipe 10, enabling the valve of the invention to be utilized in controlling the flow of fluids under very small pressures. The opening 46 in the boss 43 of the lower seal unit 40 is made large enough to permit flow of fluid around the intermediate portion 62 of the rod 60. The opening 47 is somewhat larger than the opening 46 and is formed to provide clearance for the boss 54 extending downward from the plate 52 of the upper seal unit 50.

The unique valve construction of the invention utilizing two aligned openings and a vertically moving rod permits the flow of fluid through the valve at a uniform maximum rate for the entire flowing period, flow being positively shut off following the removal of the intermediate portion 62 of the rod 60 from the opening 45 in the lower seal unit. This is an important advantage over the previous types of flush tank float-controlled valves wherein the rate of flow of fluid decreased gradually as the fluid level in the tank increased, thereby requiring a longer filling period. It is preferred to so position the various portions of the rod 60 and the openings in the upper and lower seal units that, as the tank is being filled, the upper opening 55 is closed by the intermediate portion 62 before the intermediate portion 62 is removed from the lower opening 45. This makes the shut-off action of the valve positive, there being no fluid flow out of the pressure chamber after the opening 55 is closed.

When the flow of a fluid through a pipe is blocked instantaneously, an undesirable noise, referred to as "hammer," results. Hammer is reduced to a negligible amount in the valve of the invention by providing the rod 60 with the end portion 63 which partially blocks the opening 45. As the intermediate portion 62 of the rod is moved upward out of the opening 45, fluid starts to flow upward around the end portion 63 through the opening 45 into the larger opening 46. A slight throttling action is present which prevents the pressure in the chamber from building up to the maximum instantaneously. The time required for the diaphragm 42 to move downward and engage the face 37 may be controlled by the relative sizes of the end portion 63 and opening 45. It is preferred that the travel time for the diaphragm be in the order of a few tenths of a second. Thus, hammer is substantially eliminated without appreciably affecting the tank filling rate prior to shutoff.

The movement of the rod through the opening in the diaphragm also provides a cleaning action and prevents particles from becoming lodged in the opening.

Very little noise is produced in the valve described herein by the fluid flowing through and out of the valve. Referring to Fig. 2, the direction of flow of the fluid through the valve is reversed by the impinging of the fluid on the flexible diaphragm 42 which acts as a cushion to reduce the turbulence created by the flow reversal, there being no forces urging the diaphragm downward when the upper opening 55 is open and lower opening 45 is closed. The flow passages through the valve are dimensioned so that there are no restrictions in the path followed by the fluid, the total cross-sectional area of the four outlet passages 27, 28, 29 and 30 being greater than the cross-sectional area of the inlet passage in the standpipe 10. The straight passages of uniform cross section in the outlets 27, 28, 29 and 30 convert any turbulence in the flow at the entrance to the passages to a laminar flow at the exit so that flowing noises are a minimum. When the length of a straight pipe of uniform cross section is at least one and one-half times as great as the maximum distance across the cross section, the flow of water leaving such a pipe will be substantially laminar. The use of a plurality of outlet passages of small cross-sectional area, as disclosed in the invention, permits a valve with relatively short outlet passages to have a quite laminar flow at the exit. It is understood that the invention is not restricted to the use of four outlet passages since the advantages of the short outlet passages and quiet flow can be obtained using three, five, or some other number of outlet passages. However, the embodiment disclosed is preferred because of its simplicity and low cost of construction.

The valve of the invention is adaptable for use with the conventional outwardly extending lever arm with a hollow, spherical float attached to the end thereof. However, the float 20 disclosed in Fig. 1 is preferred because of the compact over-all design permitted by this novel float construction, and also because the unique design eliminates the problem of the float becoming filled with water due to leaks therein. The float 20 is open at the lower end thereof and is filled with air each time the tank 11 is emptied, the float being suspended above the bottom of the tank by the lever 17 and bracket 21.

An alternative embodiment of the invention is shown in Figs. 7 and 8. This embodiment is similar in design and operation to the embodiment disclosed in Figs. 2 and 3 with the exceptions discussed below. A lower seal unit 140, comprising a cylindrical wall 141 and a diaphragm 142 attached to the lower end of the wall 141 with a boss 143 extending downward from the diaphragm, is positioned on the ring 38 within the casing 15. An opening is provided in the boss 143 concentric with the casing 15, the opening having a lower portion 146 and a hemispherical upper portion 147. It should be noted that the lower seal unit 40 of Fig. 3 could be used in the embodiment of Fig. 8 if the opening 47 were made hemispherical in shape, as is the opening 147 in the lower seal unit 140. A rod 160 is positioned in the opening 55 in the upper seal unit 50, the rod having a hemispherically-shaped end 163 so dimensioned as to engage the opening 147 and block the opening 146 when so engaged. The rod 160 has an eyelet 177 formed in the upper end thereof, the eyelet slidably engaging the lever 17 which is pivotally mounted on the pin 76 in the shell 66 of the cap 16. A clearance slot 180 is provided in the shell 66 so that the rod may move both vertically and horizontally without contacting the shell.

When the lever 17 is in the up position, shown in phantom in Fig. 7, the rod 160 is in its upward position, as seen in Fig. 8, with the hemispherical end 163 out of engagement with the opening 147. The boss 54 surrounding the upper opening 55 urges the rod 160 to the center position as seen in Fig. 8. Then the fluid flowing in the standpipe 10 enters the pressure chamber 53 and shuts off further fluid flow as described in conjunction with Fig. 3. As the lever 17 pivots downwardly, the rod 160 is moved downward until the end 163 engages the opening 147, blocking flow of fluid through the opening 146. Further downward motion of the lever 17 produces a horizontal force on the rod 160 at the junction of the bottom of the eyelet 177 and the lower edge of the lever 17, causing the rod 160 to rotate about the hemispherical end 163 and to deform the opening 55 in the upper seal unit 50, thereby permitting the pressure in the chamber 53 to be reduced to atmospheric.

When the lever 17 moves in an upward direction, the opening 55 returns to its normal shape because of the resilient action of the boss 54, before the rod 160 is raised vertically to open the opening 146. Thus, the desirable sequence of closing the upper opening prior to opening the lower opening which can be achieved in the contruction of Fig. 3 may also be achieved with the construction of Fig. 8. The various other advantages and novel features of the embodiment discussed in conjunction with Figs. 2 and 3 are also applicable to the embodiment shown in Figs. 7 and 8.

Although several exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a valve for controlling flow of a fluid, the combination of: inlet pipe means; outlet pipe means; a valve seat positioned between said inlet pipe means and said outlet pipe means; means defining a pressure chamber, said means having a first opening therein and having a flexible wall, said wall having a second opening therein, said wall being so positioned that when flexed in one direction it will engage said valve seat to block flow of fluid between said inlet pipe means and said outlet pipe means, said first opening connecting said pressure chamber to an exhaust, said second opening connecting said pressure chamber with said inlet pipe means; a rod engageable with said first and second openings for blocking flow of fluid through said openings when in particular positions; and means coupled to said rod for moving said rod to close said first opening when in one position and to close said second opening when in another position.

2. In a valve for controlling flow of a fluid, the combination of: inlet pipe means; outlet pipe means; a valve seat positioned between said inlet pipe means and said outlet pipe means; means defining a pressure chamber, said means having a first opening therein and having a flexible wall, said wall having a second opening therein, said wall being so positioned that when flexed in one direction it will engage said valve seat to block flow of fluid between said inlet pipe means and said outlet pipe means, said first opening connecting said pressure chamber to an exhaust, said second opening connecting said pressure chamber with said inlet pipe means; a rod engageable with said first and second openings for blocking flow of fluid through said openings when in particular positions; and means coupled to said rod for moving said rod to close said first opening when in a first position, to close said second opening when in a second position, and to close both of said openings when in a position intermediate said first and second positions.

3. In a valve for controlling flow of a fluid, the combination of: inlet pipe means; outlet pipe means; a valve seat positioned between said inlet pipe means and said outlet pipe means; means defining a pressure chamber, said means having a first opening therein and having a flexible wall, said wall having a second opening therein, said first and second openings being coaxial, said wall being so positioned that when flexed in one direction it will engage said valve seat to block flow of fluid between said inlet pipe means and said outlet pipe means, said first opening connecting said pressure chamber to an exhaust, said second opening connecting said pressure chamber with said inlet pipe means; a rod slidably positioned in and extendible through said openings for blocking flow of fluid through said openings when in particular positions, said rod having an end portion and a central portion connected by an intermediate portion, said end and central portions having axially disposed gaps in the surface thereof providing flow paths therealong; and means coupled to said rod for moving said rod from a flow position to a shut position, said end portion being positioned in said second opening and said intermediate portion being positioned in and sealing said first opening when said rod is in said shut position, said central portion being positioned in said first opening and said intermediate portion being positioned in and sealing said second opening when said rod is in said flow position.

4. In a valve for controlling flow of a fluid, the combination of: inlet pipe means; outlet pipe means; a valve seat positioned between said inlet pipe means and said outlet pipe means; means defining a pressure chamber, said means having a first opening therein and having a flexible wall, said wall having a second opening therein, said first and second openings being coaxial, said wall being so positioned that when flexed in one direction it will engage said valve seat to block flow of fluid between said inlet pipe means and said outlet pipe means, said first opening connecting said pressure chamber to an exhaust, said second opening connecting said pressure chamber with said inlet pipe means; a rod slidably positioned in and extendible through said openings for blocking flow of fluid through said openings when in particular positions, said rod having an end portion and a central portion connected by an intermediate portion, said end and central portions having axially disposed gaps in the surface thereof providing flow paths therealong; and means coupled to said rod for moving said rod from a flow position to a shut position, said end portion being positioned in said second opening and said intermediate portion being positioned in and sealing said first opening when said rod is in said shut position, said central portion being positioned in said first opening and said intermediate portion being positioned in and sealing said second opening when said rod is in said flow position, said intermediate portion being positioned in and sealing said first and second openings when said rod is in a position between said shut and flow positions.

5. In a valve for controlling flow of a fluid, the combination of: inlet pipe means; outlet pipe means; a valve seat positioned between said inlet pipe means and said outlet pipe means; means defining a pressure chamber, said means having a first temporarily deformable opening therein and having a flexible wall, said wall having a second opening therein, said wall being so positioned that when flexed in one direction it will engage said valve seat to block the flow of fluid between said inlet pipe means and said outlet pipe means, said first opening connecting said pressure chamber to an exhaust, said second opening connecting said pressure chamber with said inlet pipe means; a rod slidably positioned in said first opening and pivotally engageable with said second opening; and means coupled to said rod for moving said rod axially and radially in said first opening from a shut position to a flow position, said rod sealing said first opening when in said shut position, said rod deforming said first opening and sealing said second opening when in said flow position.

6. In a valve for controlling flow of a fluid, the combination of: inlet pipe means; outlet pipe means; a valve seat positioned between said inlet pipe means and said outlet pipe means; means defining a pressure chamber, said means having a first temporarily deformable opening therein and having a flexible wall, said wall having a second opening therein, said wall being so positioned that when flexed in one direction it will engage said valve seat to block the flow of fluid between said inlet pipe means and said outlet pipe means, said first opening connecting said pressure chamber to an exhaust, said second opening connecting said pressure chamber with said inlet pipe means; a rod slidably positioned in said first opening and pivotally engageable with said second opening; and means coupled to said rod for moving said rod axially and radially in said first opening from a shut position to a flow position, said rod sealing said first opening when in said shut position, said rod deforming said first opening and sealing said second opening when in said flow position, said rod sealing said first and second openings when in a position between said flow and shut positions.

7. In a float-controlled valve for controlling the fluid level in a tank having a vertical fluid inlet pipe, the combination of: valve means adapted to be mounted on the inlet pipe for controlling flow of fluid from the inlet pipe; lever means movable in a vertical plane; means coupling said lever means to said valve means so that movement of said lever means actuates said valve means; float means having a vertically extending opening therethrough, the inlet pipe being positionable within said opening while permitting flow of fluid through said opening, said float means being movable vertically relative to the inlet pipe; and means coupling said float means to said lever means in driving relationship.

8. A valve as defined in claim 7, in which said float means comprises: a structure having a first continuous wall enclosing an inner zone; a second continuous wall enclosing said first wall, said first and second walls defining an outer zone therebetween, said inner zone corresponding to said opening in said float means whereby the inlet pipe is positioned within said inner zone while permitting flow of fluid through said inner zone; and means joining said first and second walls at the upper edges thereof in airtight relationship.

9. In a valve for use in a flush tank having a vertical standpipe providing for upward flow of a fluid, the combination of: valve means adapted to be mounted on the standpipe for controlling flow of fluid from the standpipe; a plurality of pipe means for directing flow of fluid downward from said valve means to a container, said plurality of pipe means being disposable about the standpipe and parallel thereto, each of said plurality of pipe means having a straight flow passage of uniform cross section that is at least one and one-half times as long as the maximum lineal dimension of said uniform cross section; and a refill pipe having an upwardly opening inlet and a downwardly opening outlet, said outlet being disposed laterally from said inlet, said inlet telescopingly engaging one of said plurality of pipe means at the lower end thereof for directing fluid flow to said outlet.

10. In a valve for controlling the upward flow of a fluid, the combination of: an inlet pipe providing for upward flow of the fluid; an outlet pipe; a valve seat positioned between said inlet pipe and said outlet pipe; means defining a pressure chamber, said means having a flexible wall so positioned that when flexed in one direction it will engage said valve seat to block flow of fluid between said inlet pipe and said outlet pipe; a hollow boss carried by said flexible wall and extending downward into said inlet pipe, the lower end of said boss being below said valve seat during all phases of operation of the valve, said hollow boss providing a first flow passage from said inlet pipe to said pressure chamber; a second flow passage in said means defining a pressure chamber for exhausting said pressure chamber; rod means slidably positioned in said second flow passage and engageable with said first flow passage; and means for moving said rod means to block said first flow passage and to open said second flow passage.

11. In a valve for controlling flow of a fluid, the combination of: inlet pipe means; outlet pipe means; a valve seat positioned between said inlet pipe means and said outlet pipe means; a casing having a cylindrical opening therein, said casing including a passage interconnecting said inlet pipe means and said outlet pipe means; a first seal telescopingly mounted in said cylindrical opening of said casing, said first seal comprising a cylindrical shell and a diaphragm attached to the lower portion thereof, said diaphragm having a lower axial opening therethrough connecting with said passage in said casing; a second seal telescopingly mounted in said first seal, said second seal comprising a cylindrical shell and a diaphragm attached to the upper portion thereof, said diaphragm having an upper axial opening therethrough, said first and second seals being of flexible temporarily deformable material, said first and second seals enclosing a pressure chamber; rod means slidably positioned in said upper opening and engageable with said lower opening to block flow of fluid through said openings; and means for moving said rod means to block said upper opening and to open said lower opening permitting flow of fluid from said inlet pipe means to said pressure chamber urging said shell of said second seal into contact with said shell of said first seal and said shell of said first seal into contact with said casing, said fluid in said pressure chamber flexing said diaphragm of said first seal into contact with said valve seat to block said passage.

12. A valve as defined in claim 11, in which said diaphragm of said second seal includes a boss extending into said pressure chamber, said upper opening being through said boss, said fluid in said pressure chamber urging the walls of said boss into contact with said rod means.

13. A valve as defined in claim 11, in which said diaphragm of said first seal includes a boss extending downward into said inlet pipe means, the lower end of said boss being below said valve seat during all phases of operation of the valve, said lower opening being through said boss, said rod means being slidably movable into said lower opening, the incoming fluid urging the walls of said boss into contact in said rod means.

14. In an actuating mechanism for a flush tank or the like, the combination of: a casing having a fluid inlet and a fluid outlet; a valve positioned within said casing; a rod mounted in said valve, said rod being axially slidable in said valve to open and close said valve; a circular loop formed on one end of said rod; a lever; means pivotally mounting said lever in said casing, said lever having a cylindrical portion passing through and engaging said loop in driving relationship; and linear guide means formed in said casing, a portion of the rim of said loop being positioned in said guide means whereby pivotal motion of said lever is converted to axial linear motion of said rod.

15. In an actuating mechanism for a flush tank or the like, the combination of: a casing having a fluid inlet and a fluid outlet; a valve positioned within said casing; a rod mounted in said valve, said rod being slidable and pivotable in said valve to open and close said valve, said valve including means urging said rod to a center position; a circular loop formed on one end of said rod; a lever; and means pivotally mounting said lever in said casing, said lever having a cylindrical portion passing through and slidingly engaging said loop in driving relationship, whereby pivotal motion of said lever is converted to a combined pivotal and axial motion of said rod.

16. In a valve for controlling the fluid level in a tank having a vertical fluid inlet pipe, the combination of: valve means adapted to be connected to the upper end of such inlet pipe, said valve means having an inlet opening adapted to communicate with the interior of such inlet pipe, and having an outlet opening adapted to communicate with the tank, and having a valve seat between said inlet and outlet openings and a valve unit having a chamber therein, said valve unit having a portion adapted to be moved to seat on said valve seat, and a pair of aligned openings coupling said chamber with said inlet opening and an exhaust respectively whereby fluid may flow from such inlet pipe to said chamber and to the exhaust; shaft means positioned in said valve unit and movable therein to engage said aligned openings and block flow of fluid therethrough; lever means; and connecting means connecting said lever means and said shaft means, whereby upward movement of said lever means to a predetermined position causes said shaft means to engage said aligned opening coupling said chamber with the exhaust filling said chamber and seating said portion on said valve seat, and downward movement of said lever means causes said shaft means to engage the other of said aligned openings permitting said chamber to exhaust and unseating said portion.

References Cited in the file of this patent
UNITED STATES PATENTS

| | | |
|---|---|---|
| 925,538 | Weaver | June 22, 1909 |
| 1,270,901 | Watrous | July 2, 1918 |
| 1,338,179 | Hohmeister | Apr. 27, 1920 |
| 1,729,484 | Lee | Sept. 24, 1929 |
| 2,143,204 | McCormack | Jan. 10, 1939 |
| 2,189,427 | Long | Feb. 6, 1940 |
| 2,444,958 | Smith | July 13, 1948 |